US 8,499,657 B2

(12) United States Patent
Sasada et al.

(10) Patent No.: US 8,499,657 B2
(45) Date of Patent: Aug. 6, 2013

(54) TRANSMISSION FOR WORK VEHICLE

(75) Inventors: Atsushi Sasada, Komatsu (JP); Hiroaki Takeshima, Komatsu (JP); Yoshito Komatsu, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/822,417

(22) PCT Filed: Apr. 24, 2012

(86) PCT No.: PCT/JP2012/060935
§ 371 (c)(1),
(2), (4) Date: Mar. 12, 2013

(87) PCT Pub. No.: WO2013/027446
PCT Pub. Date: Feb. 28, 2013

(65) Prior Publication Data
US 2013/0174682 A1    Jul. 11, 2013

(30) Foreign Application Priority Data
Aug. 23, 2011   (JP) .................................. 2011-181725

(51) Int. Cl.
*F16H 3/08* (2006.01)
(52) U.S. Cl.
USPC .......................................................... 74/331
(58) Field of Classification Search
USPC .................................... 74/330, 331, 333, 340
See application file for complete search history.

(56) References Cited

U.S. PATENT DOCUMENTS

| 7,377,191 | B2 * | 5/2008 | Gitt ................................ 74/330 |
| 7,470,206 | B2 * | 12/2008 | Rodgers, II ................... 475/218 |
| 7,490,526 | B2 * | 2/2009 | Forsyth ........................... 74/330 |
| 7,987,739 | B2 * | 8/2011 | Okadome et al. ............... 74/331 |
| 8,033,194 | B2 * | 10/2011 | Suzuki ............................ 74/331 |
| 8,156,835 | B2 * | 4/2012 | Suzuki ............................ 74/331 |

FOREIGN PATENT DOCUMENTS

| JP | 3-219152 A | 9/1991 |
| JP | 9-86202 A | 3/1997 |
| JP | 11-230278 A | 8/1999 |
| JP | 2007-506918 A | 3/2007 |

OTHER PUBLICATIONS

International Search Report of corresponding PCT Application No. PCT/JP2012/060935, Aug. 23, 2011.

* cited by examiner

*Primary Examiner* — Ha D Ho
(74) *Attorney, Agent, or Firm* — Global IP Counselors, LLP

(57) ABSTRACT

A multi-shaft transmission is mounted on a work vehicle for performing loader work, and includes a power transmission mechanism for transmitting power from an input shaft through a countershaft to an output shaft. A shifting part shifts a drivetrain from the input shaft to the output shaft. The power transmission mechanism includes a forward clutch and a reverse clutch for forward-reverse shifting, and a plurality of speed stage shifting clutches for changing speed stages, wherein at least one of the forward clutch and the reverse clutch has a plurality of speed region shifting clutches. The shifting part shifts only one clutch among the plurality of speed stage shifting clutches and the plurality of speed region shifting clutches to change speeds when a plurality of speed stages are used in be loader work.

3 Claims, 13 Drawing Sheets

| Speed change stages | Direction (speed) shifting clutches | | Speed stage shifting clutches | | |
|---|---|---|---|---|---|
| | FL | FH | C1 | C2 | C3 |
| F1 | O | | O | | |
| F2 | | O | O | | |
| F3 | O | | | O | |
| F4 | | O | | O | |
| F5 | O | | | | O |
| F6 | | O | | | O |

FIG. 1

| Speed change stages | Forward-reverse shifting (speed change) clutches | | | Speed stage shifting clutches | | |
|---|---|---|---|---|---|---|
| | F L | F H | R | C 1 | C 2 | C 3 |
| F 1 | O | | | O | | |
| F 2 | O | | | | O | |
| F 3 | | O | | | O | |
| F 4 | O | | | | | O |
| F 5 | | O | | | | O |
| R 1 | | | O | O | | |
| R 2 | | | O | | O | |
| R 3 | | | O | | | O |

TRANSMISSION FOR WORK VEHICLE

CROSS-REFERENCE TO RELATED APPLICATIONS

This application claims priority to Japanese Patent Application No. 2011-181725 filed on Aug. 23, 2011, the disclosure of which is hereby incorporated herein by reference in its entirety.

FIELD OF THE INVENTION

The present invention relates to a transmission, and in particular to a multi-shaft transmission mounted on a work vehicle for performing loader work.

BACKGROUND ART

A backhoe loader that is a work vehicle has a loader bucket at the front of the vehicle and a backhoe at the rear of the vehicle. Moreover, an operator seat provided in an operator cabin is configured in a rotatable manner to face toward the front when driving or operating the loader bucket, and face toward the rear when operating the backhoe.

A multi-shaft transmission is mounted in the backhoe loader described above. The transmission has an input shaft to which power from an engine is inputted, an output shaft that outputs power to the wheels, and one or more countershafts disposed between the input shaft and the output shaft. The shafts are provided with a hydraulic clutch for forward-reverse shifting, and a plurality of hydraulic clutches for speed shifting. Hydraulic clutch will be hereinbelow referred to simply as "clutch."

Forward-reverse shifting clutches in a conventional transmission each have one forward clutch and one reverse clutch. However, in this configuration, the number of speeds when moving forward is limited and a multistage configuration cannot be achieved. As a result, acceleration performance during traveling is poor from a medium speed to a high speed.

Accordingly, increasing the number of speed shifting clutches to establish multistaging has been considered. However, when the number of speed shifting clutches is increased, the number of components increases and the overall transmission becomes larger. Moreover, when the number of speed shifting clutches is increased for forward movement, the number of stages for reverse movement which is unnecessary for multistaging is also increased in addition to the forward side.

To resolve this type of problem, a transmission disclosed in Japanese Patent Laid-open No. H11-230278 has been provided. The transmission disclosed in this publication is equipped with an input shaft, two countershafts, and an output shaft. A reverse clutch and a low-speed forward clutch are provided on the input shaft, and a high-speed forward clutch is provided on one of the countershafts. Moreover, three clutches are provided as speed shifting clutches.

As described above, since the transmission disclosed in Japanese Patent Laid-open No. H11-230278 has a forward low-speed clutch and a forward high-speed clutch as clutches for low-high speed shifting when moving forward, and has first to third clutches as speed shifting clutches, six forward speed stages can be achieved and multistaging can be realized with a few number of components.

SUMMARY

The characteristic mode of use of a backhoe loader not only includes being used for loader work at a work site, but also includes being used for moving between work sites or being used for driving from a location where the backhoe loader is stored to a work site. As a result, in addition to good workability, backhoe loaders are required to demonstrate good traveling performance.

Thus the backhoe loader with multistaging due to the configuration as disclosed in Japanese Patent Laid-open No. H11-230278 demonstrates improved acceleration performance when shifting from medium speed to high speed. As a result, good traveling performance is demonstrated.

On the other hand, although work is performed using the lower speeds during loader work, there is a problem in that responsiveness is poor when changing speeds between the lower speeds. This is because shifting is performed between the forward low-speed clutch and the forward high-speed clutch, and between the speed shifting clutches when changing speeds. This poor responsiveness accompanying clutch shifting when changing speeds is explained in detail below.

When responsiveness during speed changes is poor, a period of torque stoppage when torque from the engine is not transferred to the wheels becomes longer during a speed change. If the period of torque stoppage is long during a speed change, the speed of the vehicle drops significantly during the speed change. Since this drop in the vehicle speed when changing speeds becomes relatively large especially when working at a slow speed, the operator feels uncomfortable and the shock when changing speeds increases. Moreover, poor responsiveness when changing speeds hinders quick working.

An object of the present invention is to maintain good travel performance through multistaging and allow speed changes in slow speeds mainly used while working to be performed smoothly in a work vehicle.

Here, the poor responsiveness when a speed change is performed between low speeds in Japanese Patent Laid-open No. H11-230278 will be explained in detail. Speed levels when the clutches are on and off in the transmission in this publication are shown in FIG. 1. The circles "○" in FIG. 1 indicate that the clutch is on (clutch engaged condition=power transmission state). Only forward movement is shown in FIG. 1.

FIG. 2 illustrates changes in command hydraulic pressures of the clutches when changing, for example, from a forward second gear (F2) to a forward third gear (F3) in the transmission of this publication. As can be seen from FIG. 1, a forward high-speed clutch FH and a speed shifting first clutch C1 are engaged in the forward second gear, and the forward low-speed clutch FL and a speed shifting second clutch C2 are engaged in the forward third gear.

FIG. 2(a) illustrates a command hydraulic pressure change of the second clutch C2 that is engaged when the speed is changed from the forward second gear to the third gear, and FIG. 2(b) illustrates a command hydraulic pressure change of the first clutch C1 that is disengaged during this speed change. FIG. 2(c) illustrates a command hydraulic pressure change of the forward low-speed clutch FL that is engaged when the speed is changed from the forward second gear to the third gear, and FIG. 2(d) illustrates a command hydraulic pressure change of the forward high-speed clutch FH that is disengaged during this speed change.

When performing a speed change from the forward second gear to the forward third gear, the forward low-speed clutch FL and the second clutch C2 are used (engaged). At this time, it is conceivable that engagement commands are sent to both of the clutches concurrently in order to perform the speed change quickly. However, when engagement commands are sent to both of the clutches at the same time, which of the forward low-speed clutch or the second clutch actually enters the clutch engaged condition first cannot be guaranteed. If the forward low-speed clutch FL is supposedly engaged before the second clutch C2, the first clutch C1 that is in the engaged state in the forward second gear and the forward low-speed clutch FL become transiently engaged. When the forward low-speed clutch FL and the first clutch C1 are engaged, the forward first gear is established as can be seen in FIG. 1.

As described above, there is a possibility that the speed may be transiently shifted down to the forward first gear despite the speed being shifted up from forward second gear to third gear. A deceleration occurs temporarily despite the acceleration from the forward second gear to the third gear, and the operator feels a large shock when the speed changes.

In order to avoid the speed change defect described above, it is necessary to control the clutches with the timings shown in FIG. 2.

Specifically, when the speed change from the forward second gear to the third gear is actuated, an engagement command is first outputted to the speed shifting second clutch C2 at a timing t1. Next, an engagement command is outputted to the low-speed forward clutch FL at the point in time that a fill-on is detected in the second clutch C2. A "fill-on" is a state in which a cylinder chamber at the back surface of a piston in a hydraulic clutch is filled with operating fluid. The speed change to the forward third gear is completed at a timing t2 when the hydraulic pressure of the operating fluid supplied to the forward low-speed clutch FL has exceeded a certain value.

By engaging the clutches with these timings, the defect such as the temporary deceleration when actuating a shift up can be avoided.

However, when controlling the clutches with the above-mentioned timings, the period of time from the timing t1 when the operator actuates the speed change until the timing t2 when the speed change to the forward third gear is completed increases. In this case, a torque stoppage occurs during the speed change and the period of time increases. In particular, when a torque stoppage for a long period of time occurs in a low-speed region while performing loader work and the like, the speed of the vehicle drops dramatically in that period and a shock occurs at the point in time that the speed change to the forward third gear is completed. Moreover, quick work cannot be performed since the speed change responsiveness is poor.

The speed change does not drop as much due to the inertia of the vehicle in the medium speed to high speed region in which traveling is performed by using a change from the medium speed stage to the high-speed stage even when a long period of time is needed to change speeds and torque stoppage occurs. As a result, the shock that the operator feels is relatively small when the speed change is completed. In view of the foregoing, the present invention reduces shock during speed changes and improves workability due to quick speed changes particularly in a low-speed region while performing loader work.

A work vehicle transmission according to a first aspect of the present invention is a multi-shaft transmission mounted on a work vehicle for performing loader work, and includes an input shaft to which power is inputted, an output shaft connected to wheels of the work vehicle, at least one countershaft disposed between the input shaft and the output shaft, a power transmission mechanism for transmitting power from the input shaft through the countershaft to the output shaft, and a shifting part for changing a drivetrain from the input shaft to the output shaft. The power transmission mechanism includes a forward clutch and a reverse clutch for forward-reverse shifting, and a plurality of speed stage shifting clutches for changing speed stages, wherein at least one of the forward clutch and the reverse clutch has a plurality of clutches for shifting speed regions. The shifting part shifts only one clutch among the plurality of speed stage shifting clutches and the plurality of speed region shifting clutches to change speeds when a plurality of speed stages are used in the loader work.

Here, only one clutch among the plurality of speed stage shifting clutches and the plurality of speed region shifting clutches is shifted to change speeds when a plurality of speed stages are used in the loader work. As a result, the time period needed to change speeds is relatively short in comparison to shifting two clutches as in the conventional transmission. Therefore, a shock when changing speeds can be suppressed, and moreover workability can be improved due to quick speed changes.

In the work vehicle transmission according to a second aspect of the present invention, the shifting part related to the transmission of the first aspect shifts at least one speed region shifting clutch among the plurality of speed region shifting clutches and the plurality of speed stage shifting clutches in a speed stage higher than a loader work speed stage.

Here, a speed change may occur due to the shifting of two clutches in the high-speed speed stage. However, since a drop in the speed of the vehicle is small even if a long period of time is needed to change speeds in the high-speed region, the shock that the operator feels when changing speeds is small.

In the work vehicle transmission according to a third aspect of the present invention, the forward clutch related to the transmission of the first or second aspects has a first forward clutch and a second forward clutch, and the speed stage shifting clutch has a first clutch, a second clutch, and a third clutch. The shifting part controls the clutches in the speed stages as described below.

In the forward first gear, the first forward clutch and the first clutch are in a power transmission state, and the other clutches are in a power shutoff state.

In the forward second gear, the first forward clutch and the second clutch are in the power transmission state, and the other clutches are in the power shutoff state.

In the forward third gear, the second forward clutch and the second clutch are in the power transmission state, and the other clutches are in the power shutoff state.

In the forward fourth gear, the first forward clutch and the third clutch are in the power transmission state, and the other clutches are in the power shutoff state.

In the forward fifth gear, the second forward clutch and the third clutch are in the power transmission state, and the other clutches are in the power shutoff state.

In the reverse first gear, the reverse clutch and the first clutch are in the power transmission state, and the other clutches are in the power shutoff state.

In the reverse second gear, the reverse clutch and the second clutch are in the power transmission state, and the other clutches are in the power shutoff state.

In the reverse third gear, the reverse clutch and the third clutch are in the power transmission state, and the other clutches are in the power shutoff state.

When changing speeds between the forward first gear and third gear when performing loader work, the change in speed is possible with the shifting of only one clutch. Specifically, the change in speed is possible between the forward first gear and second gear by only shifting between the first clutch and the second clutch. The change in speed is possible between the forward second gear and third gear by only shifting between the forward first clutch and the forward second clutch.

In the work vehicle transmission according to a fourth aspect of the present invention, the forward clutch related to the transmission of the first aspect has a first forward clutch and a second forward clutch disposed on the input shaft.

Generally, the rotation speed of the input shaft is the highest and this rotation is reduced and transmitted to the output shaft in a work vehicle transmission. Therefore, the torque of the input shaft is the smallest. Since the forward and reverse clutches that have the highest frequency of use are disposed on the input shaft, the capacities of the clutches are reduced so that the clutches can be made more compact, and furthermore, wear of clutches can be reduced.

The output shaft of the work vehicle transmission according to a fifth aspect of the present invention that is related to any transmission of the first to fourth aspects has a forward output shaft for transmitting power from the countershaft to the front wheels, and a rear output shaft for transmitting power from the countershaft to the rear wheels.

The present invention as described above is able to maintain good travel performance due multistaging and can suppress shock when changing speeds in a low-speed region in a work vehicle for performing work particularly in the low-speed regions. Furthermore, workability can be improved due to quick changes in speed.

BRIEF DESCRIPTION OF DRAWINGS

FIG. 1 illustrates engagement and disengagement of clutches in speed stages during forward movement in a conventional transmission.

DESCRIPTION OF EMBODIMENTS

Overall Configuration

Figure 2:
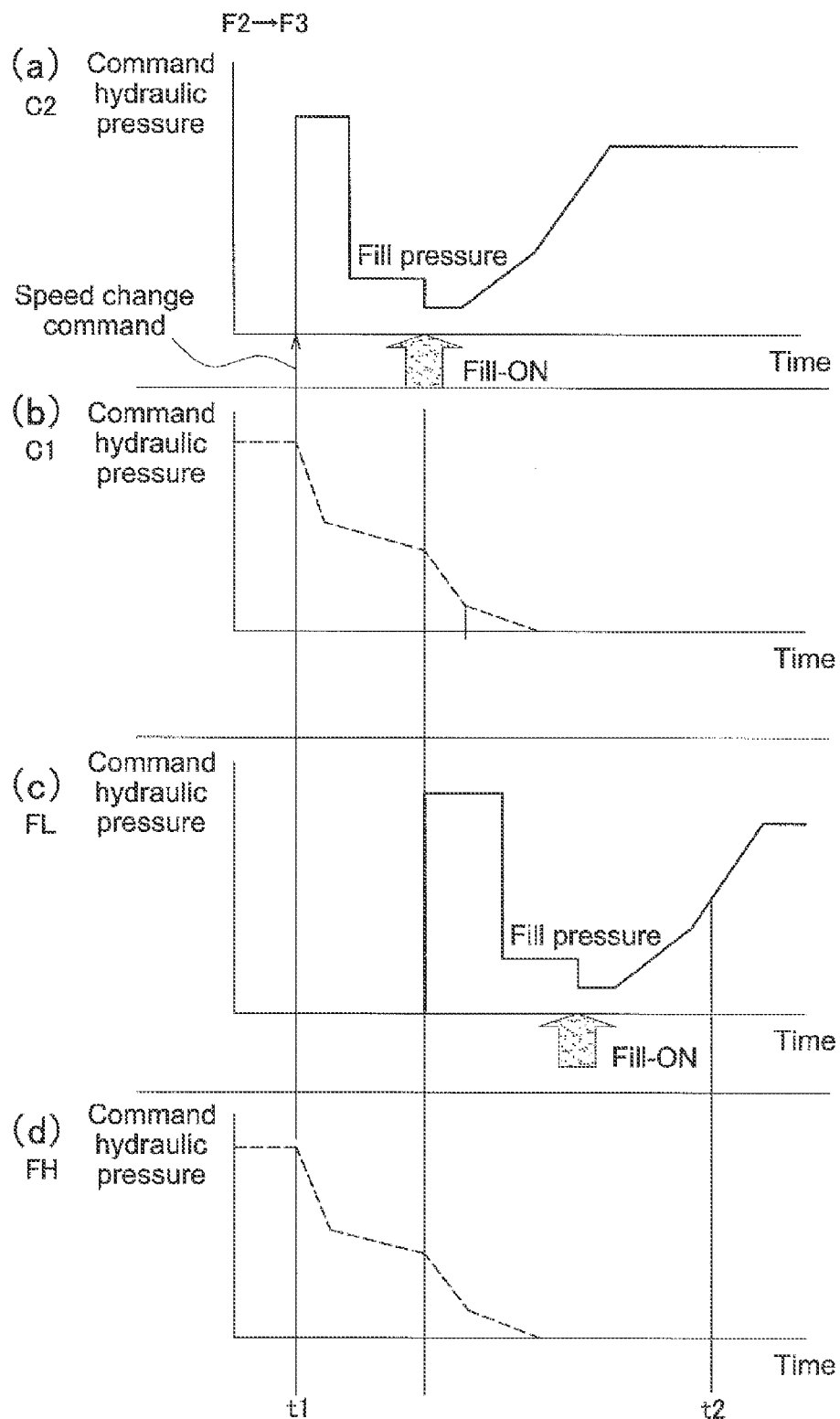
FIG. 2 illustrates changes in command hydraulic pressures to clutches for explaining a defect when changing speeds in a conventional transmission.
Figure 3:
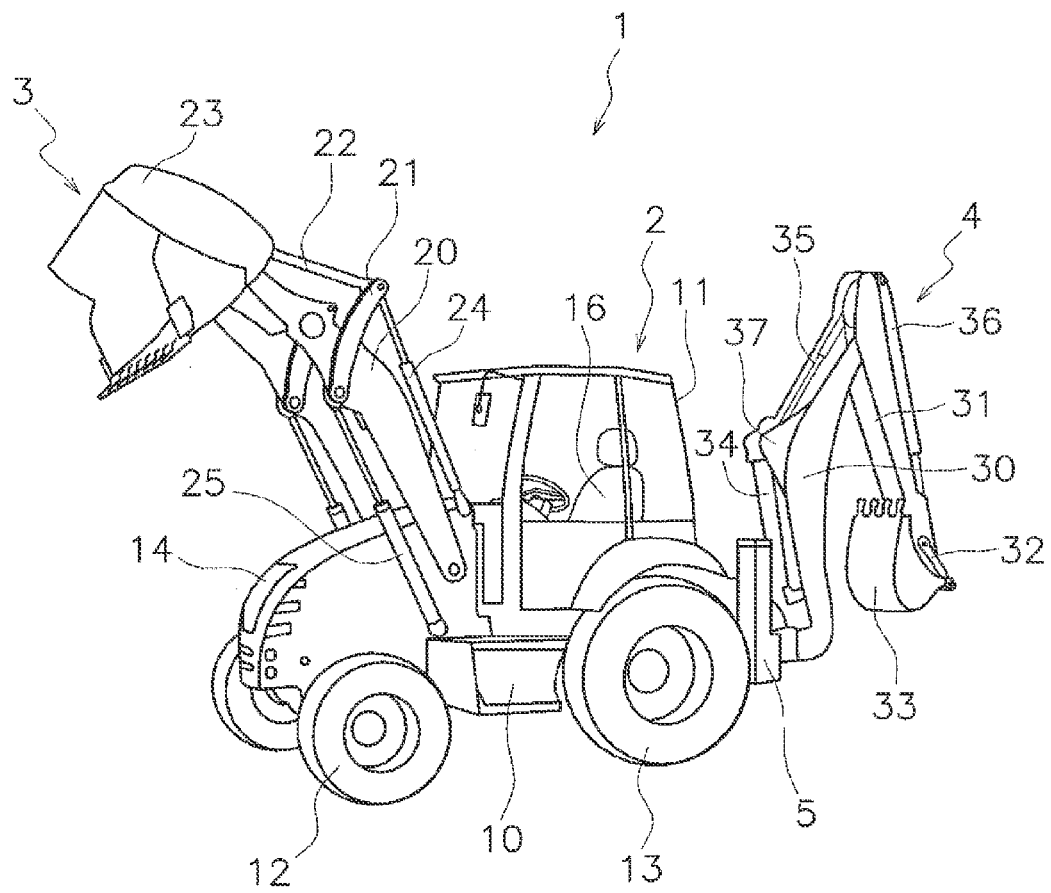
FIG. 3 is an external perspective view of a backhoe loader according to one embodiment of the present invention.

An external view of a backhoe loader 1 as a work vehicle according to an embodiment of the present invention is illustrated in FIG. 3. The backhoe loader 1 is a work vehicle that can perform excavation work and loading work as one vehicle. The backhoe loader is mainly equipped with a body 2, a loader 3, a backhoe 4, and left and right stabilizers 5.

The body 2 includes a frame 10 for supporting equipment such an engine and a transmission 6 (see FIG. 4), an operator cabin 11 mounted on the frame 10, and a pair of front wheels 12 and a pair of rear wheels 13. A characteristic configuration of the backhoe loader 1 is that the diameter of the rear wheels 13 is larger than the diameter of the front wheels 12. Therefore, the axle connected to the front wheels 12 is disposed at a position lower than the position of the axle connected to the rear wheels 13. Equipment such as the engine and transmission are covered by an enclosure cover 14. An operating seat 16 on which the operator sits is provided inside the operator cabin 11. The operating seat 16 can be rotated between a forward facing position and a rearward facing position. A steering wheel, various pedals, operating members for operating the loader 3 and the backhoe 4, a forward-reverse shifting lever for forward-reverse shifting operation, and a speed change lever for speed change operation, and the like are provided inside the operator cabin 11.

The engine is mounted in the front portion of the frame 10. The engine drives the front wheels 12 and the rear wheels 13 via the transmission and the axles, and also drives a hydraulic pump for actuating various hydraulic equipment.

Figure 4:
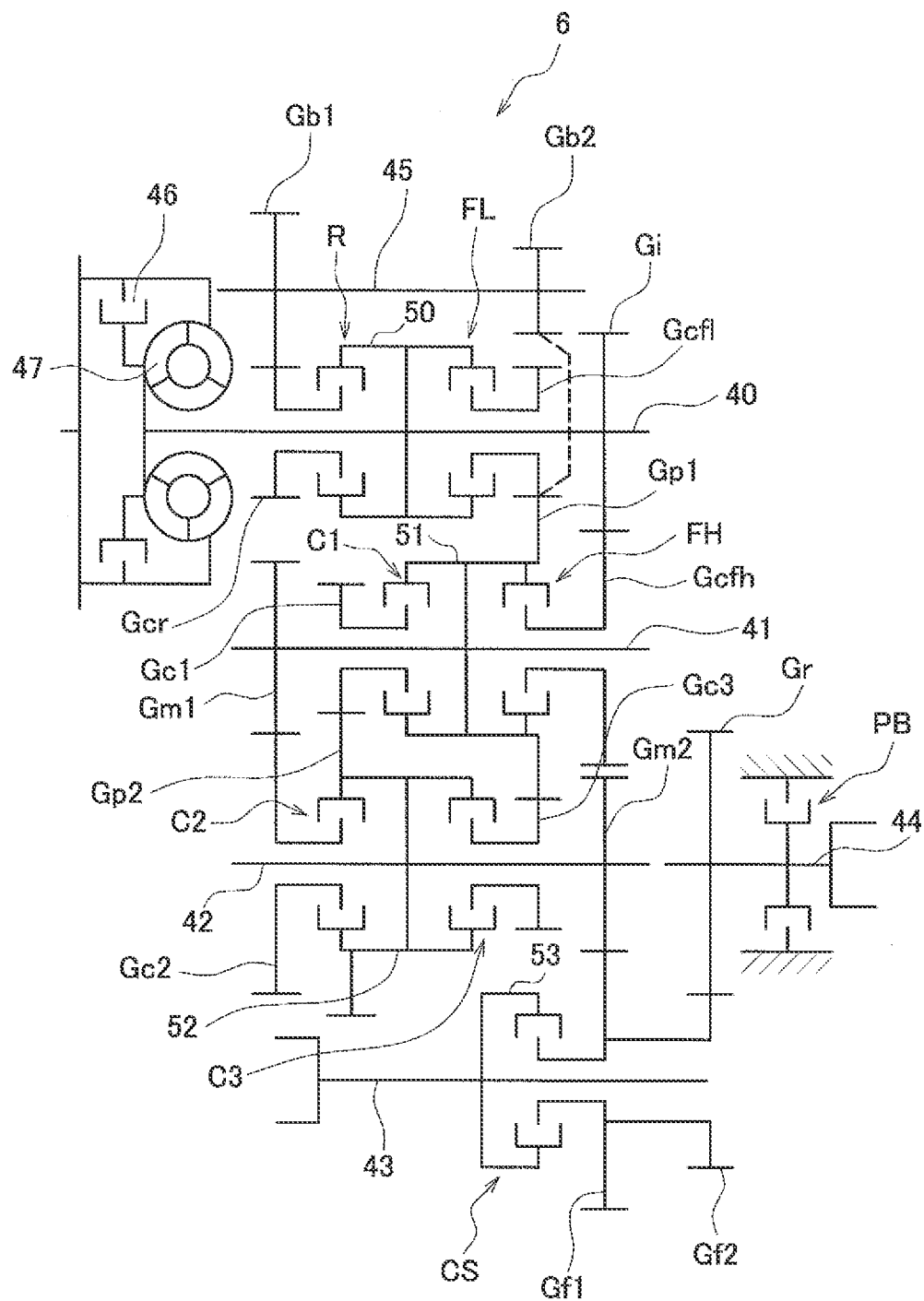
FIG. 4 is a schematic configuration of a transmission of the backhoe loader.

The transmission 6, which is described in further detail below, has a plurality of shafts and each of the shafts except for the reverse shaft are provided with hydraulic clutches and hydraulic brakes as illustrated in FIG. 4.

The loader 3 is disposed in front of the operator cabin 11 and is a working device for performing loading work. The loader 3 has a loader arm 20, a bracket 21, a link 22, a loader bucket 23, a bucket cylinder 24, and an arm cylinder 25.

A proximal end portion of the loader arm 20 is pivotably supported on the frame 10, and the loader bucket 23 is pivotably supported at a distal end of the loader arm 20. A proximal end portion of the bracket 21 is pivotably supported on the loader arm 20, and the distal end of the rod in the bucket cylinder 24 and one end of the link 22 are pivotal connected to the distal end of the bracket 21. A proximal end portion of the bucket cylinder 24 is pivotably supported on the frame 10. The distal end of the link 22 is pivotably connected to the bucket 23. A proximal end portion of the arm cylinder 25 is pivotal supported on the frame 10, and the distal end of the rod in the arm cylinder 25 is pivotably connected to an intermediary portion in the longitudinal direction of the loader arm 20.

According to the above configuration, the loader arm 20 is pivoted upward when the rod of the arm cylinder 25 protrudes, and the loader arm 20 is pivoted downward when the rod of the arm cylinder 25 retreats. Moreover, the bracket 21 is pivoted forward when the rod of the bucket cylinder 24 protrudes, and the loader bucket 23 is pivoted downward when the link 22 moves forward. Conversely, the bracket 21 is pivoted backward when the rod of the bucket cylinder 24 retreats, and the loader bucket 23 is pivoted upward when the link 22 moves backward.

The backhoe 4 is disposed at the rear of the operator cabin 11, and is a work device for performing excavation work. The backhoe 4 includes a boom 30, an arm 31, a bucket link 32, a backhoe bucket 33, a boom cylinder 34, an arm cylinder 35, and a bucket cylinder 36. A proximal end portion of the boom 30 is supported to allow for pivoting in the right and left direction on the frame 10 via a bracket that is not illustrated. A proximal end portion of the arm 31 is pivotably connected to the distal end portion of the boom 30, and the backhoe bucket 33 is pivotably connected to the distal end of the arm 31. One end of the boom cylinder 34 is pivotably connected to a bracket (not illustrated) attached to the frame 10, and the other end is pivotably connected to a boom bracket 37 fixed to the boom 30. One end of the arm cylinder 35 is pivotably connected to the boom bracket 37, and the other end is pivotably connected to the proximal end portion of the arm 31. The proximal end portion of the bucket cylinder 36 is pivotably connected to the arm 31, and the distal end is pivotably connected to the bucket link 32.

According to the above configuration, the boom 30 pivots downward when the rod of the boom cylinder 34 protrudes, and the boom 30 pivots upward when the rod of the boom cylinder 34 retreats. The arm 31 pivots downward when the rod of the arm cylinder 35 protrudes, and the arm 31 pivots upward when the rod of the arm cylinder 35 retreats. Furthermore, the backhoe bucket 33 pivots via the bucket link 32 when the rod of the bucket cylinder 36 protrudes, and the opening portion of the backhoe bucket 33 approaches the arm 31. Conversely, the backhoe bucket 33 pivots via the bucket link 32 when the rod of the bucket cylinder 36 retreats, and the opening portion of the backhoe bucket 33 moves away from the arm 31.

Although not illustrated, the backhoe 4 has a bracket cylinder for pivoting in the right and left directions a boom bracket connecting the boom 30 to the frame 10. One end of the bracket cylinder is pivotably connected to the frame 10, and the distal end is pivotably connected to the boom bracket. The boom bracket pivots to one side in the right or left direction when the rod of the bracket cylinder protrudes, and the boom bracket pivots to the other side in the right or left direction when the rod of the bracket cylinder retreats.

The right and left stabilizers 5 are for stabilizing the orientation of the backhoe loader 1 and preventing overturning during operation using the backhoe 4. The left and right stabilizers 5 are respectively provided on a rear left portion and a rear right portion of the frame 10. The stabilizers 5 contact the ground when extended to the left and right sides of the backhoe loader 1, and the orientation of the backhoe loader 1 during excavation work can be stabilized by raising the rear portion of the main body of the backhoe loader 1 until the rear wheels 13 are off the ground surface.

Transmission

FIG. 4 is a schematic configuration of the transmission 6. The transmission 6 has an input shaft 40 to which power is inputted, a first countershaft 41, a second countershaft 42, a front output shaft 43, a rear output shaft 44, and a reverse shaft 45. The shafts 40 to 45 are disposed parallel to one another. The transmission 6 has a torque converter 47 having a lock-up clutch 46.

Input Shaft 40

The input shaft 40 receives power from the engine via the torque converter 47 or via the lock-up clutch 46. The input shaft 40 is disposed in the highest position among the shafts 40 to 45. An input shaft gear Gi, a reverse clutch R, and a forward low-speed clutch FL are provided on the input shaft 40. The input shaft gear Gi is fixed to the input shaft 40 in a manner that disallows relative rotation. The input sides of the reverse clutch R and the forward low-speed clutch FL have a shared input shaft clutch pack 50, and the input shaft clutch pack 50 is fixed to the input shaft 40 in a manner that disallows relative rotation. A reverse clutch gear Gcr is provided on the output side of the reverse clutch R, and a forward low-speed clutch gear Gcfl is provided on the output side of the forward low-speed clutch FL. The reverse clutch gear Gcr and the forward low-speed clutch gear Gcfl are both supported to allow for relative rotation on the input shaft 40.

First Countershaft 41

The first countershaft 41 is disposed between the input shaft 40 and the front output shaft 43. A first countershaft gear Gm1, a first clutch C1, and a forward high-speed clutch FH are provided on the first countershaft 41. The first countershaft gear Gm1 is fixed to the first countershaft 41 in a manner that disallows relative rotation. The input sides of the first clutch C1 and the forward high-speed clutch FH have a shared first clutch pack 51, and the first clutch pack 51 is fixed to the first countershaft 41 in a manner that disallows relative rotation. A first pack gear Gp1 is provided on the outer circumference of the first clutch pack 51. The first pack gear Gp1 meshes with the forward low-speed clutch gear Gcfl. A first clutch gear Gc1 is provided on the output side of the first clutch C1, and a forward high-speed clutch gear Gcfh is provided on the output side of the forward high-speed clutch FH. The forward high-speed clutch gear Gcfh meshes with the input shaft gear Gi. The first clutch gear Gc1 and the forward high-speed clutch gear Gcfh are both supported to allow for relative rotation on the first countershaft 41.

Second Countershaft 42

The second countershaft 42 is disposed between the input shaft 40 and the front output shaft 43. A second countershaft gear Gm2, a second clutch C2, and a third clutch C3 are provided on the second countershaft 42. The second countershaft gear Gm2 is fixed to the second countershaft 42 in a manner that disallows relative rotation, and meshes with the forward high-speed clutch gear Gcfh. The input sides of the second clutch C2 and the third clutch C3 have a shared second clutch pack 52, and the second clutch pack 52 is fixed to the second countershaft 42 in a manner that disallows relative rotation. A second pack gear Gp2 is provided on the outer circumference of the second clutch pack 52. The second pack gear Gp2 meshes with the first clutch gear Gc1. A second clutch gear Gc2 is provided on the output side of the second clutch C2, and a third clutch gear Gc3 is provided on the output side of the third clutch C1. The third clutch gear Gc3 meshes with the first pack gear Gp1. The second clutch gear Gc2 and the third clutch gear Gc3 are both supported in a manner that allows relative rotation on the second countershaft 42.

Front Output Shaft 43

The front output shaft 43 is provided in the lowest position among the shafts 40 to 45. The front output shaft 43 is provided in a connectable manner to the front wheels 12. A drive system shifting clutch CS is provided on the front output shaft 43. The drive system shifting clutch CS transmits power of the second countershaft 42 to the front output shaft 43 through clutch engagement, and cuts off power transmission between the second countershaft 42 and the front output shaft 43 through clutch disengagement. Specifically, the drive system shifting clutch CS is a clutch for shifting between two-wheel drive and four-wheel drive. A clutch pack 53 on the drive system shifting clutch CS is fixed to the front output shaft 43 in a manner that disallows relative rotation, A first forward output shaft gear Gf1 and a second output shaft gear Gf2 are provided on the input side of the clutch CS. The forward output shaft gears Gf1, Gf2 are both supported in a rotatable manner on the front output shaft 43, and both of the gears Gf1, Gf2 are fixed in a manner that disallows relative rotation to each other. The gears Gf1, Gf2 may be configured as one member.

Rear Output Shaft 44

The rear output shaft 44 is disposed in a position higher than the front output shaft 43. Moreover, the rear output shaft 44 differs from the conventional transmission in that the rear output shaft 44 is configured as a shaft that is separate from the second countershaft 42, and both shafts are separated from each other. The rear output shaft 44 is provided in a connectable manner to the rear wheels 13. A rear output shaft gear Gr and a parking brake PB are provided on the rear output shaft 44, The rear output shaft gear Gr is fixed to the rear output shaft 44 in a manner that disallows relative rotation, and meshes with the second output shaft gear Gf2.

Reverse Shaft 45

A first gear Gb1 and a second gear Gb2 for reverse motion are provided on the reverse shaft 45 in a manner that disallows relative rotation. The reverse first gear Gb1 meshes with the reverse clutch gear Gcr. The reverse second gear Gb2 meshes with the first pack gear Gp1.

Power Transmission Mechanism

A first power transmission mechanism that transmits power from the input shaft 40 to the first countershaft 41 and the second countershaft 42 due to the plurality of gears and clutches is configured as described above. In addition, a second power transmission mechanism is configured that transmits power from the second countershaft 42 to the front output shaft 43 and from the front output shaft 43 to the rear output shaft 44 through the second countershaft gear Gm2, the first and second forward output shaft gears Gf1, Gf2, and the drive system shifting clutch CS.

The abovementioned clutches and the parking brake PB have a plurality of friction plates and are configured by hydraulic clutches (brakes) equipped with pistons that operate due to hydraulic pressure.

Control Block

Figures 5, 6:
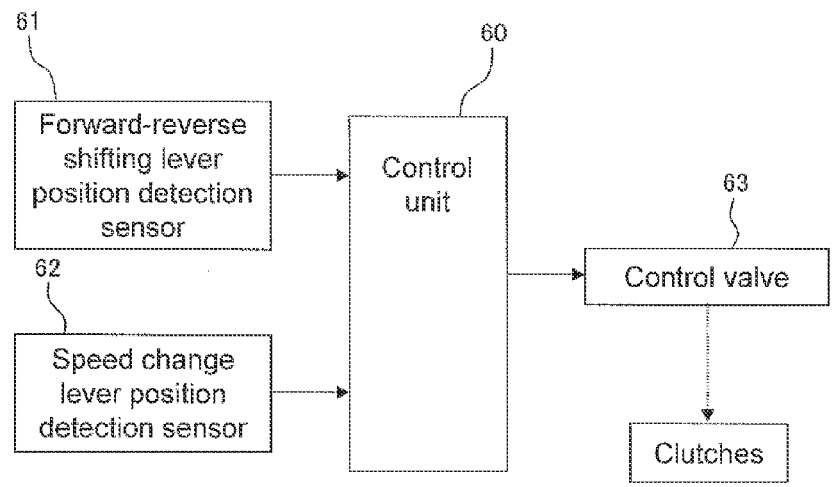
FIG. 5 is a control block diagram of the backhoe loader.
FIG. 6 illustrates engagement and disengagement of clutches in speed stages in the transmission illustrated in FIG. 4.

A control block related to speed change control is illustrated in FIG. 5. The backhoe loader 1 has a control unit 60. A sensor 61 for detecting a forward-reverse shifting lever position, and a sensor 62 for detecting a speed change lever position are connected to the control unit 60. A control valve 63 for controlling the clutches is connected to the control unit 60. Although one control valve 63 is illustrated in FIG. 5, respective control valves corresponding to each clutch are provided. Specifically, a plurality of control valves is connected to the control unit 60. The control unit 60 then receives signals from the sensors 61, 62 and outputs control signals to the control valves to control the engagement/disengagement of the plurality of hydraulic clutches provided on the shafts of the transmission 6. Specifically, the control unit 60 receives speed change lever actuations and controls the engagement and disengagement of the clutches as illustrated in FIG. 6. The circles "○" in FIG. 6 indicate that a clutch is engaged (clutch engaged condition=power transmission state).

Operation

The following is an explanation of the drivetrain in the speed change stages. The explanation herein describes a case of four-wheel drive in which the drive system shifting clutch CS is always engaged and power is transmitted from the engine to the front wheels 12 and the rear wheels 13.

Forward First Gear

The forward low-speed clutch FL and the first clutch C1 are engaged and the other clutches are disengaged in a forward first gear (F1).

Figure 7:
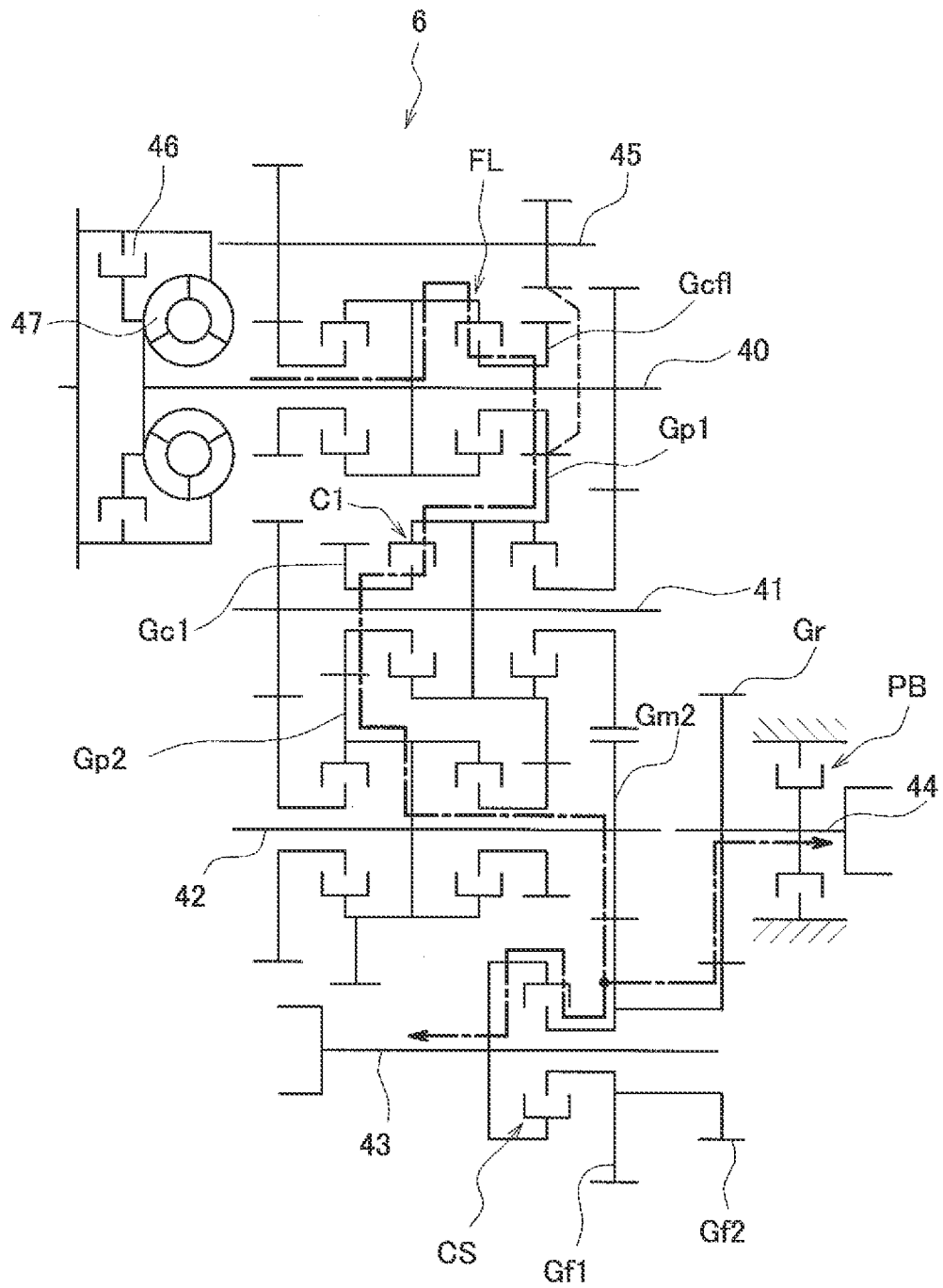
FIG. 7 illustrates a drivetrain of a forward first gear.

In this case, as illustrated by the chain line arrow in FIG. 7, power inputted to the input shaft 40 is transmitted to the front output shaft 43 and the rear output shaft 44 on the following path.

Input shaft 40→forward low-speed clutch FL→forward low-speed clutch gear Gcfl→first pack gear Gp1→first clutch C1→first clutch gear Gc1→second pack gear Gp2→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear G12→rear output shaft gear Gr→rear output shaft 44

Forward Second Gear

The forward low-speed clutch FL and the second clutch C2 are engaged in a forward second gear (F2) and the other clutches are disengaged.

Figure 8:
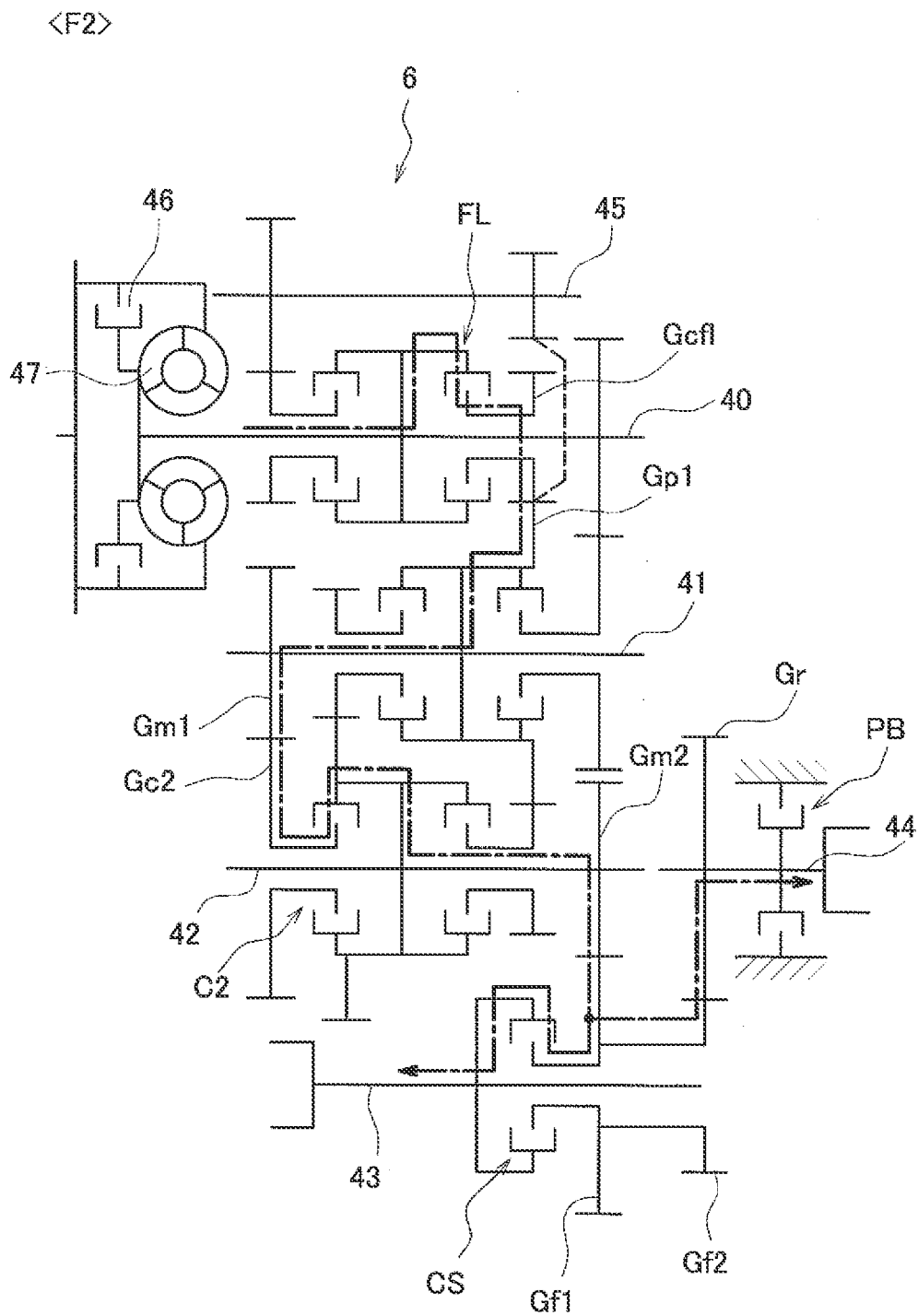
FIG. 8 illustrates a drivetrain of a forward second gear.

In this case, as illustrated by the chain line arrow in FIG. 8, power inputted to the input shaft 40 is transmitted to the front output shaft 43 and the rear output shaft 44 on the following path.

Input shaft 40→forward low-speed clutch FL→forward low-speed clutch gear Gcfl—first pack gear Gp1→first countershaft 41—first countershaft gear Gm1→second clutch gear Gc2→second clutch C2→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Forward Third Gear

The forward high-speed clutch FH and the second clutch C2 are engaged in a forward third gear (F3) and the other clutches are disengaged.

Figure 9:
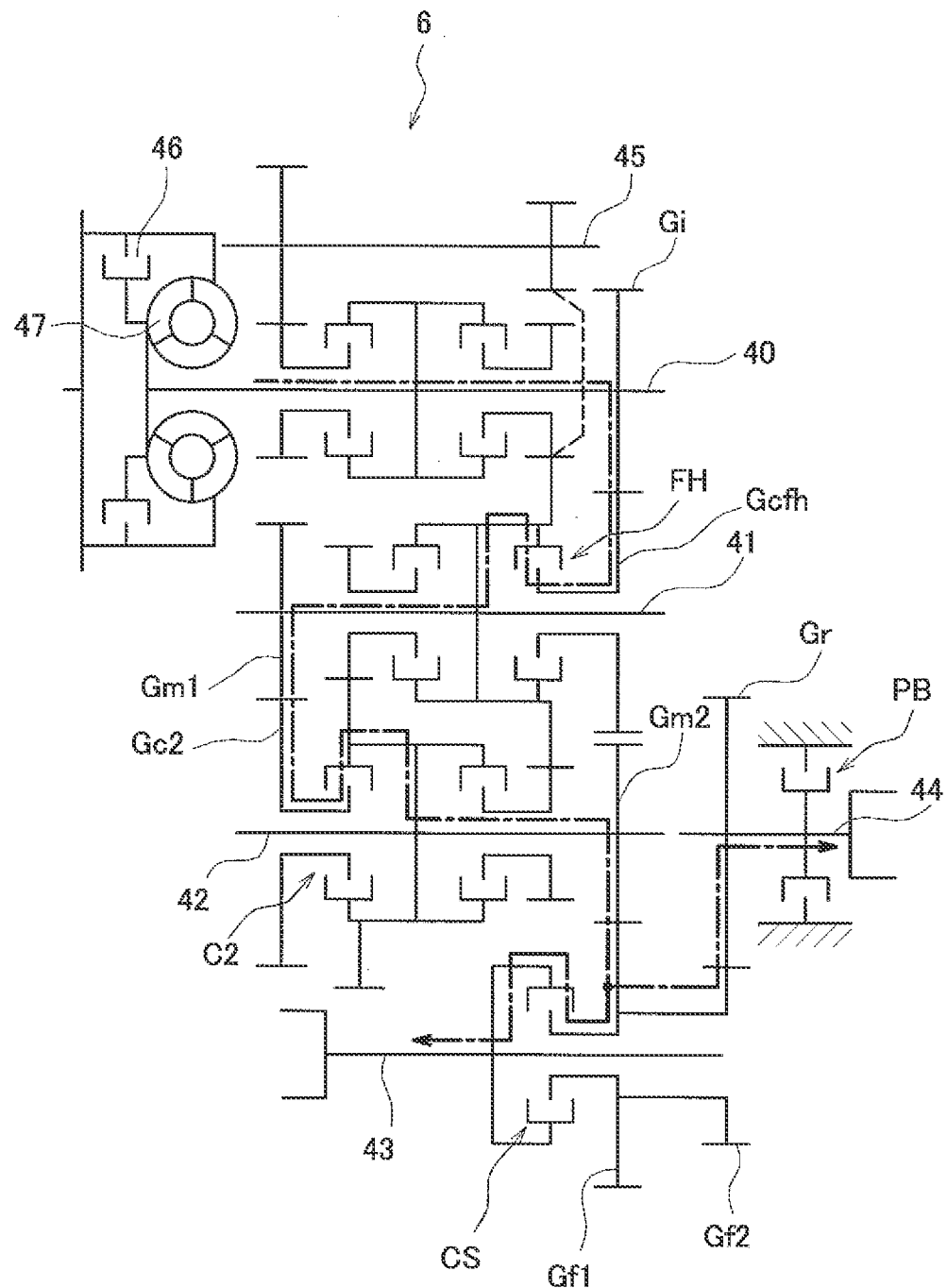
FIG. 9 illustrates a drivetrain of a forward third gear.

In this case, as illustrated by the chain line arrow in FIG. 9, power inputted to the input shaft 40 is transmitted to the front output shaft 43 and the rear output shaft 44 on the following path.

Input shaft 40→input shaft gear Gi→forward high-speed clutch gear Gcfh→forward high-speed clutch FH→first countershaft 41→first countershaft gear Gm1→second clutch gear Gc2→second clutch C2→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Forward Fourth Gear

The forward low-speed clutch FL and the third clutch C3 are engaged in a forward fourth gear (F4) and the other clutches are disengaged.

Figure 10:
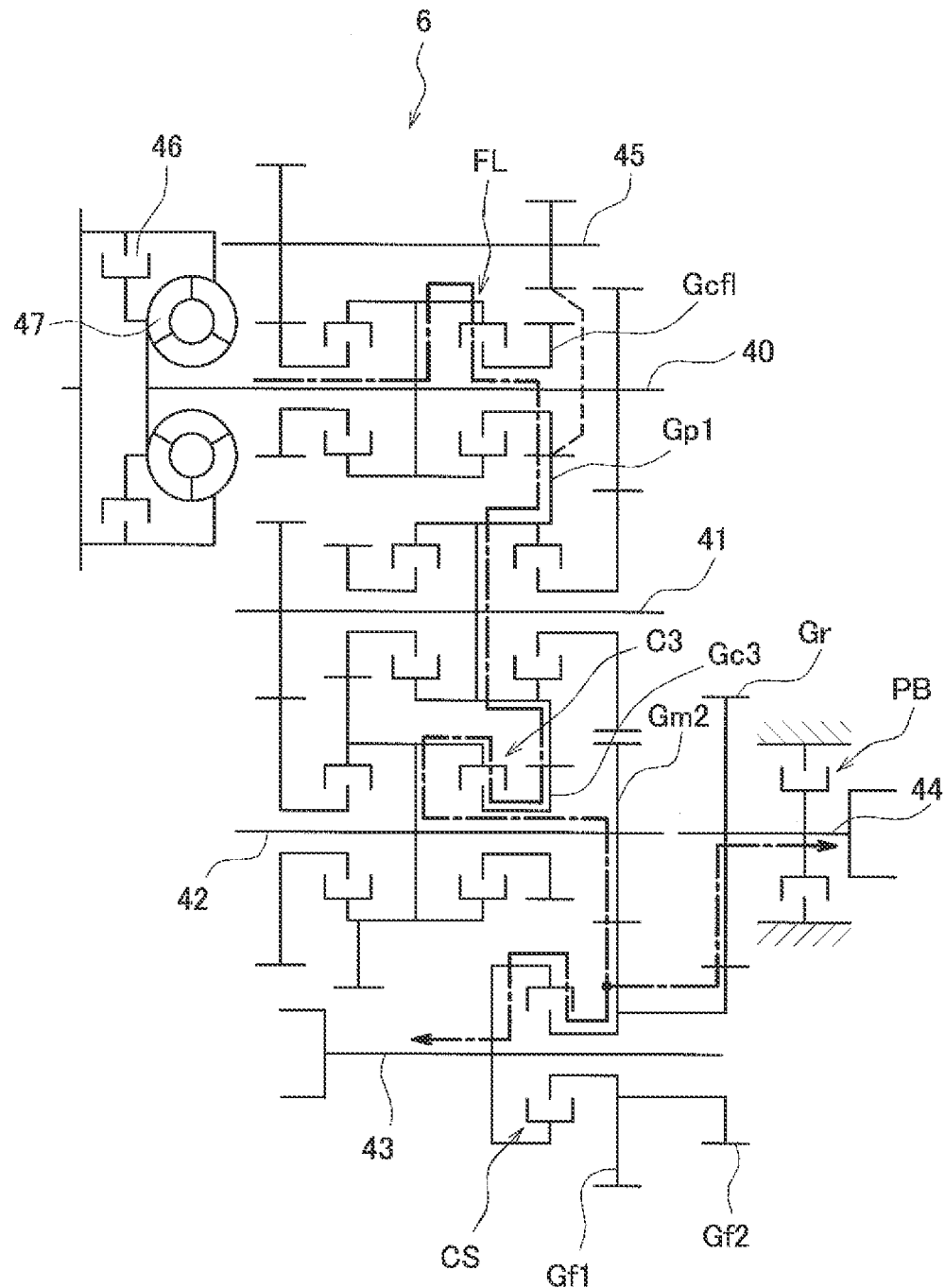
FIG. 10 illustrates a drivetrain of a forward fourth gear.

In this case, as illustrated by the chain line arrow in FIG. 10, power inputted to the input shaft 40 is transmitted to the front output shaft 43 and the rear output shaft 44 on the following path.

Input shaft 40→forward low-speed clutch FL→forward low-speed clutch gear Gcfl→first pack gear Gp1→third clutch gear Gc3→third clutch C3→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Forward Fifth Gear

The forward high-speed clutch FH and the third clutch C3 are engaged in a forward fifth gear (F5) and the other clutches are disengaged.

Figure 11:
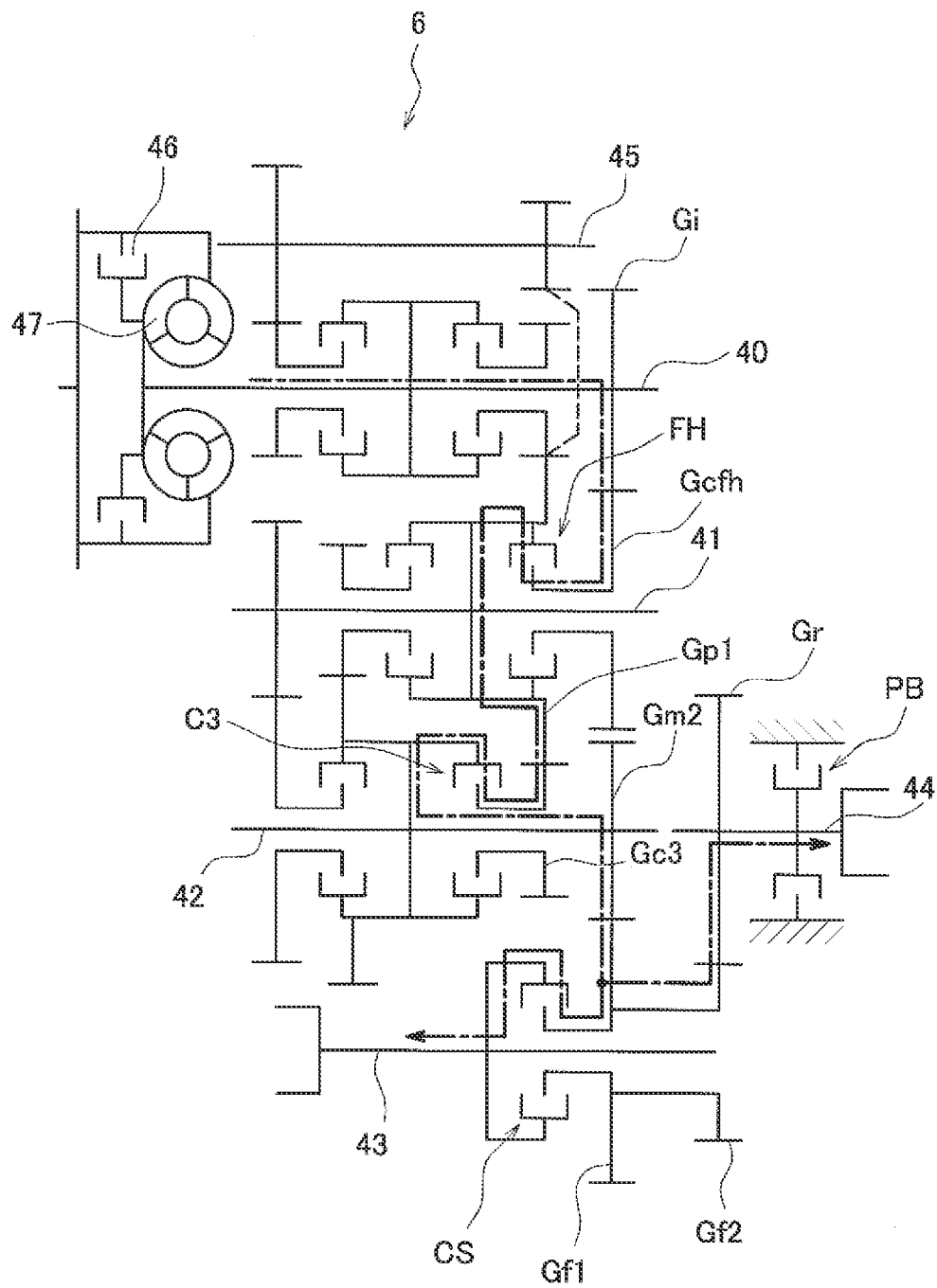
FIG. 11 illustrates a drivetrain of a forward fifth gear.

In this case, as illustrated by the chain line arrow in FIG. 11, power inputted to the input shaft 40 is transmitted to the front output shaft 43 and the rear output shaft 44 on the following path.

Input shaft 40→input shaft gear Gi→forward high-speed clutch gear Gcfh→forward high-speed clutch FH→first countershaft 41→first pack gear Gp1→third clutch gear Gc3→third clutch C3→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Reverse First Gear

The reverse clutch R and the first clutch C1 are engaged and the other clutches are disengaged in a reverse first gear (R1).

Figure 12:
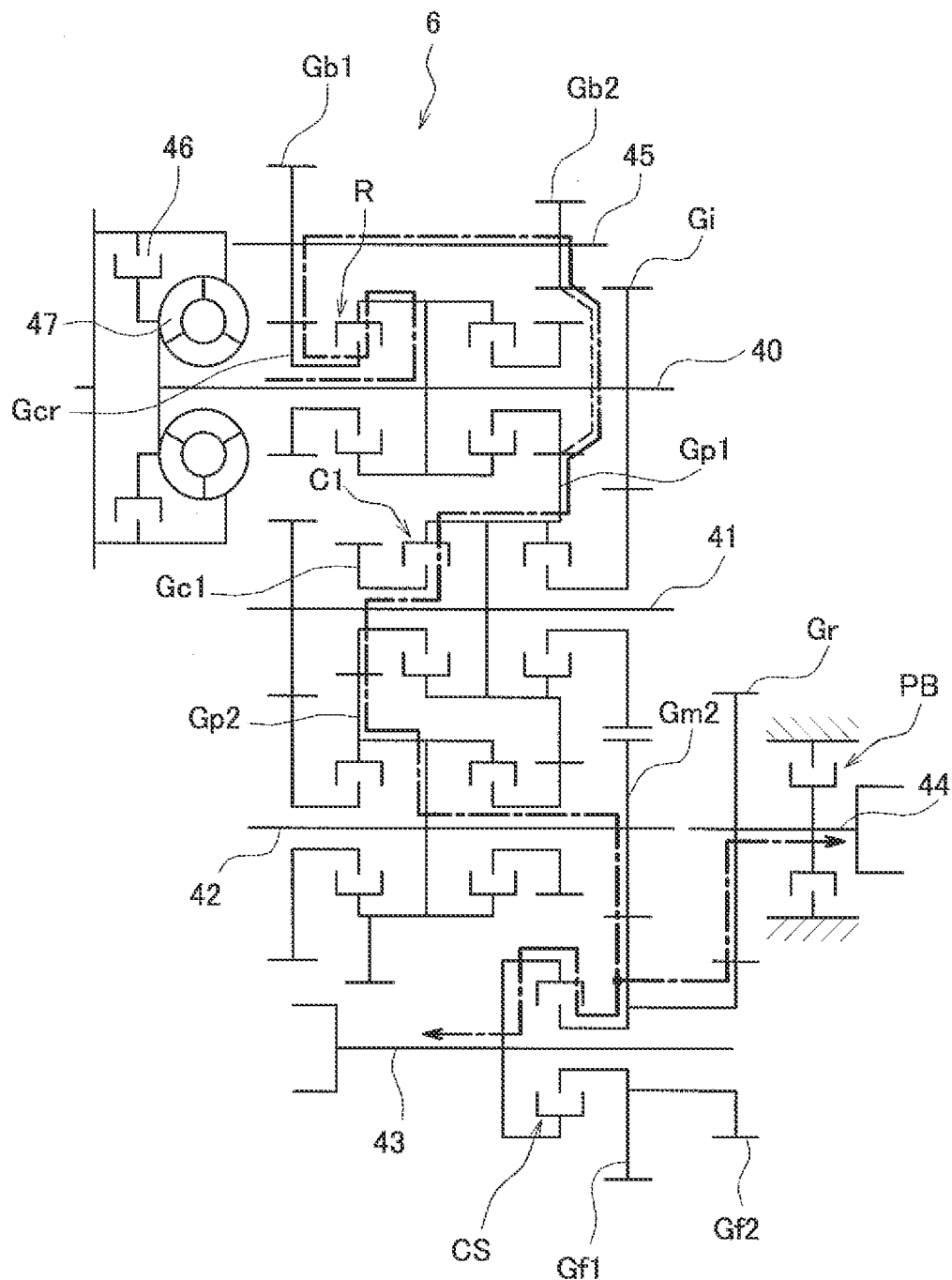
FIG. 12 illustrates a drivetrain of a reverse first gear.

In this case, as illustrated by the chain line arrow in FIG. 12, power inputted to the input shaft 40 is transmitted to the front output shaft 43 and the rear output shaft 44 on the following path.

Input shaft 40→reverse clutch R→reverse clutch gear Gcr→reverse first gear Gb1→reverse shaft 45 reverse second gear Gb2→first pack gear Gp1→first clutch C1→first clutch gear Gc1→second pack gear Gp2→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Reverse Second Gear

The reverse clutch R and the second clutch C2 are engaged (power transmission) and the other clutches are disengaged (power shutoff) in a reverse second gear (R2).

Figure 13:
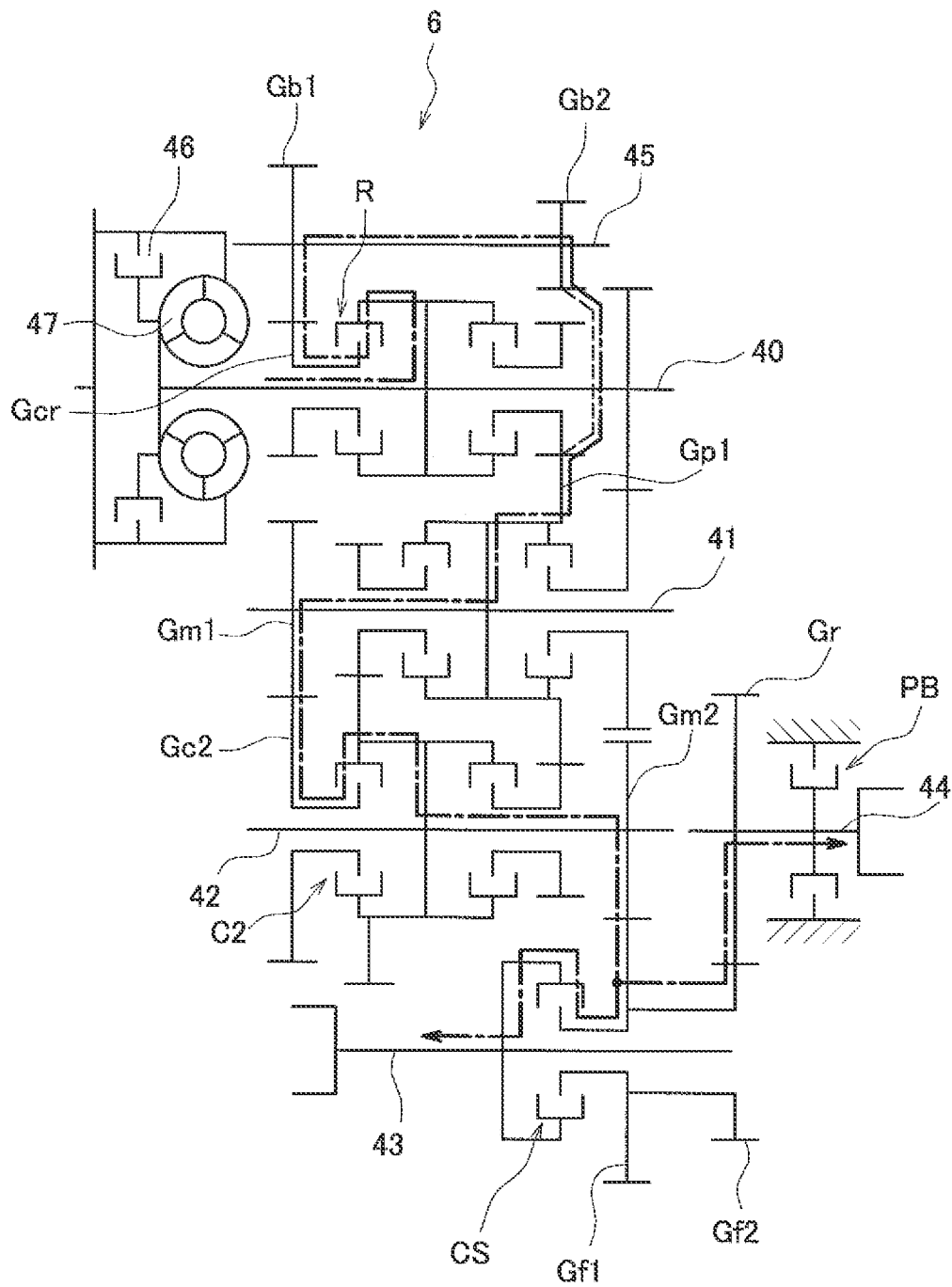
FIG. 13 illustrates a drivetrain of a reverse second gear.

In this case, as illustrated by the chain line arrow in FIG. 13, power inputted to the input shaft 40 is transmitted to the front output shaft 43 and the rear output shaft 44 on the following path.

Input shaft 40→reverse clutch R→reverse clutch gear Gcr→reverse first gear Gb1→reverse shaft 45→reverse second gear Gb2→first pack gear Gp1→first countershaft 41→first countershaft gear Gm1→second clutch gear Gc2→second clutch C2→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Reverse Third Gear

The reverse clutch R and the third clutch C3 are engaged and the other clutches are disengaged in a reverse third gear (R3).

Figure 14:
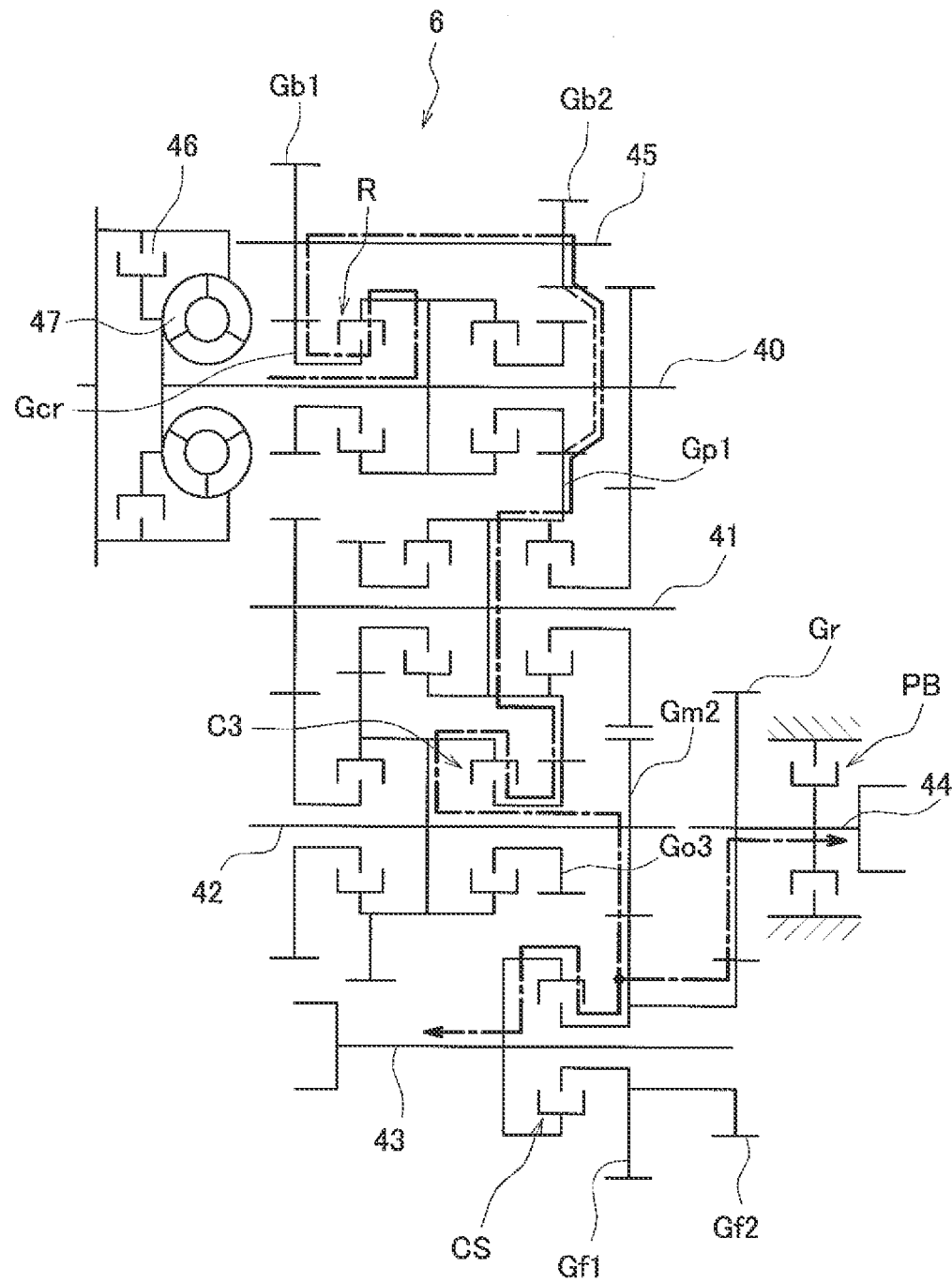
FIG. 14 illustrates a drivetrain of a reverse third gear.

In this case, as illustrated by the chain line arrow in FIG. 14, power inputted to the input shaft 40 is transmitted to the front output shaft 43 and the rear output shaft 44 on the following path.

Input shaft 40→reverse clutch R→reverse clutch gear Gcr→reverse first gear Gb1→reverse shaft 45 reverse second gear Gb2→first pack gear Gp1→third clutch gear Gc3→third clutch C3→second countershaft 42→second countershaft gear Gm2→first forward output shaft gear Gf1

Power from the first forward output shaft gear Gf1 is divided at the front wheel side and the rear wheel side and transmitted as described below.

Front wheel side:→drive system shifting clutch CS→front output shaft 43

Rear wheel side:→second output shaft gear Gf2→rear output shaft gear Gr→rear output shaft 44

Speed Change Stages used in Loader Work

Power is transmitted on the drivetrains described above for the speed change stages. Generally, the maximum speed of the vehicle is about 40 km/h in this case. Moreover, loader work is performed at a speed of about 12 km/h or less and first gear to third gear are used for the speed change stages.

Standard speeds are described below for each of the speed change stages when moving forward.

Forward first gear: 0 km/h to 5.5 km/h
Forward second gear: 0 km/h to 11.0 km/h
Forward third gear: 9.0 km/h to 16.4 km/h Forward fourth gear: 114.4 km/h to 25.6 km/h
Forward fifth gear: 23.6 km/h to 40.0 km/h Characteristics When changing speeds between the forward first gear to third gear selected during loader work, the change in speed is possible with the shifting of only one clutch in the above embodiment. Specifically, the change in speed is possible between the forward first gear and second gear by only shifting the first clutch C1 and the second clutch C2. The change in speed is possible between the forward second gear and third gear by only shifting the forward low-speed clutch FL and the forward high-speed clutch FH.

As a result, a quick speed change is possible, a drop in the speed of the vehicle when changing speeds is reduced, and a shock when changing speeds can be suppressed. Moreover, quick work is possible due to the same reasons.

Moreover, since the reverse clutch R and the forward low-speed clutch FL that are frequently used in the backhoe loader are provided on the input shaft 40 having the smallest load torque, the clutch capacities of these clutches can be reduced. Furthermore, wear on these clutches can be suppressed.

OTHER EMBODIMENT

The present invention is not limited to the above embodiments and various changes and modifications may be made without departing from the spirit of the invention.

(1) Although a forward low-speed clutch and a forward high-speed clutch are provided as forward clutches in the embodiment, a forward medium-speed clutch may be provided in addition to those clutches. Further, a similar plurality of clutches may be provided on the reverse side instead of on the forward side. Further, a similar plurality of clutches may be provided on both the reverse side and the forward side.

(2) Although the present invention is applied to a backhoe loader in the embodiment, the present invention can be applied in the same way to another work vehicle such as a wheel loader.

(3) Although an example of a transmission having two countershafts has been described in the embodiment, the number of countershafts is not limited. The present invention can be applied in the same way to a transmission having one countershaft, or having three or more countershafts.

(4) The number of speeds in the embodiment is an example and the present invention is not limited to these numbers of speeds. The same can be said with respect to the disposition of the clutches and the present invention is not limited to the dispositions in the embodiment.

The transmission according to the illustrated embodiment is able to maintain good travel performance due to multistaging and can suppress shock when changing speeds in a low-speed region in a work vehicle for performing work particularly in the low-speed regions. Furthermore, workability can be improved due to quick changes in speed.

What is claimed is:

1. A multi-shaft transmission mounted on a work vehicle for performing loader work, the transmission comprising:
   an input shaft to which power is inputted;
   an output shaft connected to wheels of the work vehicle;
   at least one countershaft disposed between the input shaft and the output shaft;
   a power transmission mechanism configured and arranged to transmit power from the input shaft through the countershaft to the output shaft; and
   a shifting part configured and arranged to shift a drivetrain from the input shaft to the output shaft;
wherein,
   the power transmission mechanism includes
   a forward clutch and a reverse clutch for forward-reverse shifting, and
   a first clutch, a second clutch, and a third clutch for changing speed stages,
   wherein the forward clutch has a first forward clutch and a second forward clutch for shifting speed regions, and
   the shifting part renders:
   the first forward clutch and the first clutch to a power transmission state, and the other clutches to a power shutoff state in a forward first gear;
   the first forward clutch and the second clutch to the power transmission state, and the other clutches to the power shutoff state in a forward second gear;
   the second forward clutch and the second clutch to the power transmission state, and the other clutches to the power shutoff state in a forward third gear;
   the first forward clutch and the third clutch to the power transmission state, and the other clutches to the power shutoff state in a forward fourth gear;
   the second forward clutch and the third clutch to the power transmission state, and the other clutches to the power shutoff state in a forward fifth gear;
   the reverse clutch and the first clutch to the power transmission state, and the other clutches to the power shutoff state in a reverse first gear;
   the reverse clutch and the second clutch to the power transmission state, and the other clutches to the power shutoff state in a reverse second gear; and
   the reverse clutch and the third clutch to the power transmission state, and the other clutches to the power shutoff state in a reverse third gear.

2. The transmission according to claim 1, wherein the forward clutch and the reverse clutch are disposed on the input shaft.

3. The transmission according to claim 1 wherein the output shaft has a front output shaft for transmitting power from the countershaft to front wheels, and a rear output shaft for transmitting power from the countershaft to rear wheels.

\* \* \* \* \*